Patented Nov. 17, 1931

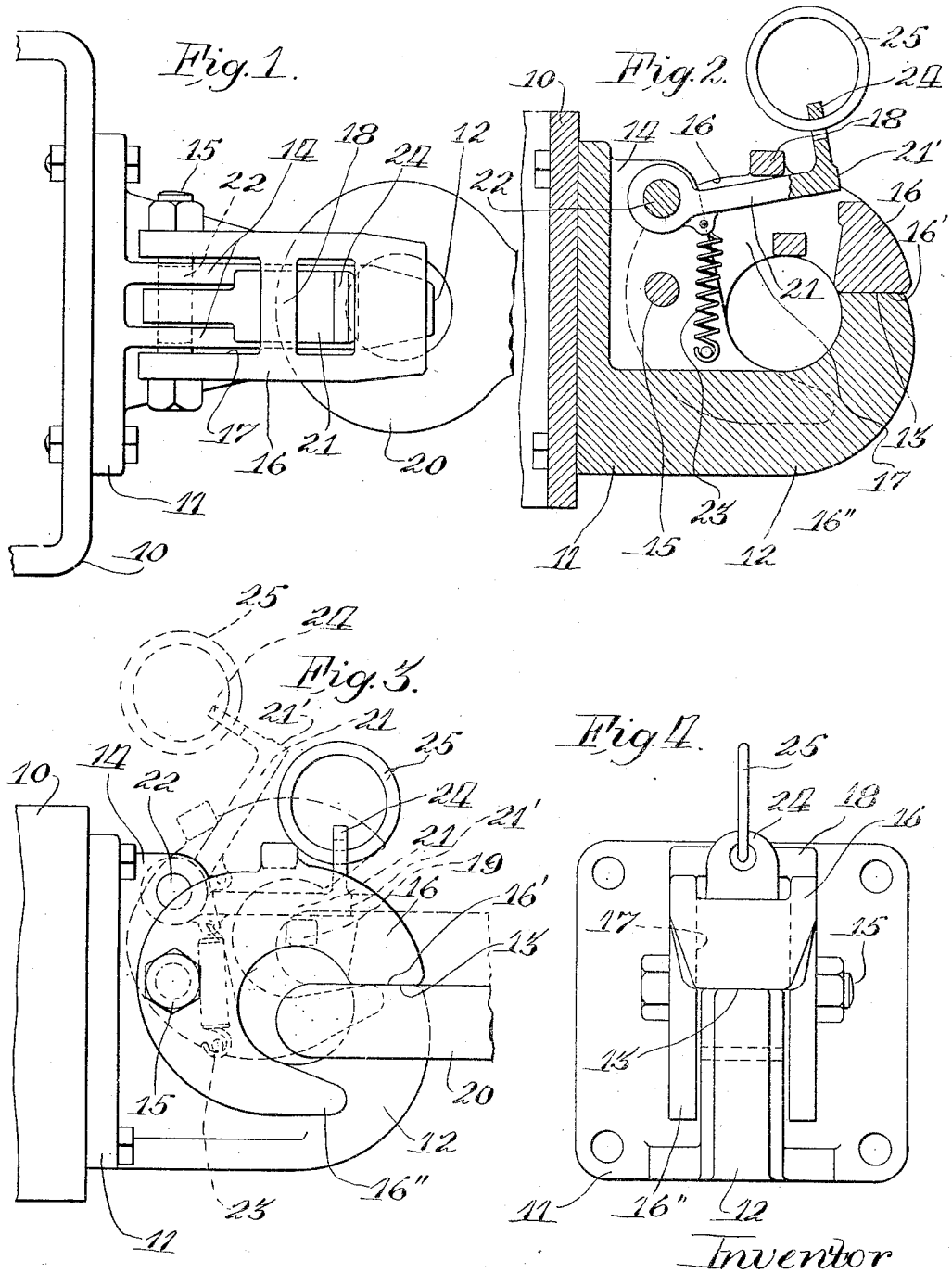

1,832,042

UNITED STATES PATENT OFFICE

ALBERT F. MOHR, OF WESTERN SPRINGS, ILLINOIS, ASSIGNOR TO INTERNATIONAL HARVESTER COMPANY, A CORPORATION OF NEW JERSEY

DRAFT APPLIANCE

Application filed October 14, 1929. Serial No. 399,419.

The invention relates to draft appliances.
More particularly, it relates to improvements in drawbar hooks.

The object of this design is to provide a locked hitch, together with means for unlocking and unhitching.

Another object is to provide a drawbar hook in which the draft force will be on a rigid stationary part and retain the clevis therein independently of any draft force on the latching means.

Still another object is to utilize a latching means which, when manually moved, releases a hook lock, opens the hook and also raises the clevis out of the hook.

Also it is an object to provide a simple, sturdy, draft appliance of the kind stated.

Other objects will be apparent to any one skilled in this art as the invention is more fully made known.

These very desirable objects may be achieved in combination with a tractor or the like provided with a draw-bar plate. This plate carries a stationary pintle hook with which is associated a pivoted hook lock and a latching means. The hitching clevis will be located in the stationary hook which takes the draft force. When the latching means is manually moved, a continuous movement thereof successively releases the hook lock, opens the hook, and rides the clevis off the pintle hook to uncouple said clevis, all as will later more fully appear.

In the drawings illustrating a practicable embodiment of the invention,—

Figure 1 is a top plan view of the improved drawbar hook;

Figure 2 is a central, vertical, sectional view through the structure;
Figure 3 is a side elevational view of the hook; and, Figure 4 is an end, elevational view.

The tractor drawbar plate is shown at 10 and to this the hook of this invention is connected in the manner now to be made known.

A bracket 11 of sturdy construction is securely bolted to the plate 10, said bracket including an integrally formed, outwardly and upwardly curved, open pintle hook 12 having its bill end flattened at 13, as shown. The hook 12 is preferably solid, as it must take all of the draft pull. Two spaced flanges 14 extending centrally from the bracket, said flanges serving as a support for a transversely arranged bolt or pivot pin 15, to which is pivotally connected a closure element 16.

Said hook closure element 16 is pivoted intermediately of its ends, as shown, and embodies a cut out middle portion 17, which portion includes an upper cross-piece 18 and a lower cross-piece 19. One end of the element 16 is finished off flat, as at 16', to abut the flat hook bill 13, while the other end of said element, as at 16'', is finished as a double tail portion that is disposed underneath a clevis 20 held by the draft appliance.

Arranged in the cut out portion 17 and between the cross-pieces 18, 19 is a latch 21 pivoted to a pin 22 arranged in the flanges 14 above the pivot pin 15. A spring 23 connected to the latch and to the hook 12 exerts a pull to hold the latch down, causing its end 21' to abut a complementary face on the closure element 16, so that said closure element cannot accidentally unlock itself for any reason. The free end of the latch bar is formed with an upstanding, apertured boss 24 that receives a ring 25 to which may be connected any suitable pull rope accessible to the operator on the tractor.

In practice the closure element 16 is swung upwardly about its pivot pin 15 by means of the latch bar 21, which is raised. When the latch bar encounters the upper cross-piece 18, it pulls up on the closure element to open the hook 12 in an obvious manner. With the hook thus opened, the clevis ring 20 is dropped thereover, as shown in the drawings, to couple or hitch an implement, for example, to the tractor. Next, the latch bar 21 is released, making the spring 23 effective to return the latch bar 21 to its normal position. The bar encounters the lower crosspiece 19 in this reverse movement to carry the closure element 16 to closed position.

To unhitch the clevis, the operator merely pulls on the ring 25 to raise the latch bar, which in turn raises the closure element in the manner already described. This causes the tail 16'' to rise and engage the clevis 20, gradually pushing the clevis up and, finally, off the hook 12 to complete the uncoupling operation.

It is interesting to note that the draft force is not utilized to lock the closure element in place and also that the draft pull is entirely on the solid, stationary hook 12.

From the above detailed description, it can now be appreciated that an improved draft appliance has been provided which accomplishes all of the desirable objects heretofore recited.

It is the intention to cover all changes and modifications which do not depart from this invention as indicated by the scope of the following claims.

What is claimed is:

1. A draft appliance adapted for connection to a draft member, said appliance comprising a bracket formed with a solid stationary hook adapted to receive a clevis and take all the pull thereof, a closure element for the hook pivotally connected to the bracket, a latch for locking the closure element against the hook, means for manually releasing the latch, said latch and closure element including means whereby the closure element is opened as the latch is released, and the closure element including a tail to engage the clevis to ride the same off the hook.

2. A draft appliance adapted for connection to a draft member, said appliance comprising a bracket formed with a solid stationary hook adapted to receive a clevis and take all the pull thereof, a flange on the bracket, a closure element for the hook pivotally connected to said flange, a latch pivotally connected to the flange for locking the closure element against the hook, means for raising the latch, said latch having means to engage the closure element to open the same, and said closure element having means to engage the clevis to ride the same off the hook.

3. A draft appliance adapted for connection to a draft member, said appliance comprising a one-piece attaching bracket formed with a stationary draft hook adapted to receive a clevis and also formed with a flange, said flange carrying two spaced pivot pins, a closure element for the hook pivoted to one of the pins, a latch to operate the closure element and pivoted to the other of said pins, and a tail on the closure element to ride the clevis off the draft hook when the closure element is opened.

4. A draft appliance adapted for connection to a draft member, said appliance comprising a bracket, a draft hook fixed to the bracket, a flange on the bracket, a closure element for the hook pivoted to the flange, said element being hollowed out, a latch passed through the closure element and pivotally connected to said flange, and means comprising top and bottom members on the closure element engageable by the latch to open or close the closure element relative to the hook.

5. A draft appliance adapted for connection to a draft member, said appliance comprising a stationary curved open hook adapted to receive a clevis and take all the pull thereof, a pivotally mounted curved hook-shaped closure element for the hook, a spring pulled pivotally mounted latch included in the closure element to close the same against the hook to secure the clevis to the hook, and means to release the latch and raise the closure element therewith to open the hook, said closure element including means to ride the clevis off the hook as it is raised.

In testimony whereof I affix my signature.

ALBERT F. MOHR.